United States Patent [19]
Ellingsen et al.

[11] Patent Number: 4,869,810
[45] Date of Patent: Sep. 26, 1989

[54] METHOD OF RECOVERING EVAPORABLE LIQUIDS FROM MUD COMPRISING FINE GRAINED PARTICLES AND THE EVAPORABLE LIQUIDS

[76] Inventors: Olav Ellingsen, Kleiva 20, N-6900 Floro; Jørgen Stabel, Bjørkeveien 5, N-4340 Bryne, both of Norway

[21] Appl. No.: 127,607

[22] Filed: Nov. 30, 1987

Related U.S. Application Data

[63] Continuation of Ser. No. 779,521, Sep. 24, 1985, abandoned.

[30] Foreign Application Priority Data

Oct. 8, 1984 [NO] Norway .................. 844020

[51] Int. Cl.$^4$ ............................. C10G 1/00
[52] U.S. Cl. ............... 208/407; 208/400; 175/66; 159/6.2; 201/41; 201/31
[58] Field of Search ........... 208/400, 407, 425, 426; 196/104, 120, 155; 201/31, 33, 41, 1, 7; 202/91, 93, 208; 175/66, 206; 159/6.2

[56] References Cited

U.S. PATENT DOCUMENTS

| | | | |
|---|---|---|---|
| 1,183,939 | 5/1916 | Whittelsey | 196/120 X |
| 1,961,232 | 6/1934 | Maust et al. | 175/66 |
| 2,870,990 | 1/1959 | Bergey | 175/66 |
| 3,500,943 | 3/1970 | Bingman, Jr. | 175/66 |
| 4,077,868 | 3/1978 | Chambers | 585/242 |
| 4,094,769 | 6/1977 | Brown | 208/426 |
| 4,222,988 | 9/1980 | Barthel | 175/66 X |
| 4,225,392 | 9/1980 | Taylor | 202/93 |
| 4,344,835 | 8/1982 | Koch | 201/33 X |
| 4,345,988 | 8/1982 | Koch | 201/33 X |
| 4,347,119 | 8/1982 | Thomas | 208/407 |
| 4,361,462 | 11/1982 | Fujii et al. | 159/6.2 |

FOREIGN PATENT DOCUMENTS

| | | |
|---|---|---|
| 243055 | of 0000 | Netherlands . |
| 1017410 | of 0000 | United Kingdom . |
| 2071138 | of 0000 | United Kingdom . |
| 2097017 | of 0000 | United Kingdom . |
| 2122635 | of 0000 | United Kingdom . |

Primary Examiner—Glenn Caldarola
Attorney, Agent, or Firm—Ladas & Parry

[57] ABSTRACT

A method of separating oil in water and other evaporable liquids from drilling mud, bleaching earth, sludge from oil tanks, oil shale or the like, the mud being evaporated at a lower temperature than with conventional evaporation due to the fact that the capillary forces binding the separate fractions in the pores of the mud are destroyed in a friction evaporator.

4 Claims, 1 Drawing Sheet

METHOD OF RECOVERING EVAPORABLE LIQUIDS FROM MUD COMPRISING FINE GRAINED PARTICLES AND THE EVAPORABLE LIQUIDS

This is a continuation of Application Ser. No. 6/779,521, filed Sept. 24, 1985, abandoned.

BACKGROUND OF THE INVENTION

The invention relates to a method of separating oil, water and other evaporable liquids from drilling mud, bleaching earth, sludge from oil tanks, oil shale, etc.

The problem in connection with recovery of oil from oil-based drilling mud became significant because it is now becoming more and more interesting to utilize such mud as opposed to water based drilling mud. This is due to considerable technical advantages in exploratory drilling as well as in production drilling of oil wells in land based as well as offshore based drilling operations.

Due to the oil content of the mud returned from the drilling hole this mud cannot be freely disposed of in nature, and if this should be done there will be severe requirements as to the treatment of the mud for removing any oil from it.

Especially the fine-grained portion of the drilling mud is problematic. The coarse-grained portion is screened off on oscillating screens and may be washed before being dumped, or residual oil may be burned off. Today, this method is mostly used on installations in the North Sea.

The fine-grained portion from the oscillating screen or the washing process is usually treated in decanters or hydrocyclones, where some oil and water is separated off from the mud.

The residual oil is strongly bonded to the fine-grained portion of the drilling mud by capillary forces, surface tension, and polar bonds, however. For this reason, there is no satisfactory manner of treating the mud.

In experimental distillation of two kinds of mud, one of which mainly consisted of so called cuttings showing a fine division from 1000 $\mu$down, and the other consisting almost exclusively of barite with a fine division from 15 $\mu$downward, it was found that surprisingly high temperatures were necessary to drive off the oil from the mud. Due to said forces an increase of the boiling point of 100° to 200° C. will occur. When it is desired to drive off the oil from the mud by heating in conventional manners in a distillation plant so high temperatures are, thus, required that part of the oil products are split up and new hydrocarbons are formed.

These conditions are disclosed in Norwegian Patent Application No. 771,423. Reference is also made to U.S. Pat. No. 3,393,951, (hereafter) according to which drilling mud is conveyed on a conveyor belt and is subjected to IR irradiation before the mud is to be dumped into the sea. Because of the temperature conditions, said method has not been used in practice, and oil in the mud cannot be recovered so as to be recycled.

The same is true as regards U. S. Pat. No. 2,266,586, where gas burners are used and the mud is also rinsed with water. It also should be mentioned that water used for preliminary washing the mud must also be purified and, furthermore, results in an increased power consumption for the heating.

U.S. Pat. No. 3,658,015 relates to a combustion oven, where the oil in the mud is only burned off. This method will, indeed, purify the mud sufficiently to make it disposable in the environment, but the oil is not recovered for recirculation in mud preparation. Due to the explosion hazard, this method has not been used in oil installations. It is also observed that it is necessary to supply energy in order to burn off the oil in the mud. Thus, this method does not differ from what is known from conventional drying kilns.

U.S. Pat. No. 3,860,091 relates to a mechanical method of purifying the mud. Said method involves the utilization of separators to remove as much oil as possible, the residual oil being removed by the aid of a detergent. This method is useful but it is very expensive due to the detergent consumption. Also, it does not result in recovering the residual oil after centrifugation due to the above mentioned capillary forces.

The above mentioned Norwegian Patent Application No. 771,423 discloses a method for evaporating oil from the mud that is conveyed through a screw conveyor heated by electrical resistance elements and/or by a heat transfer fluid, which in turn is heated by the aid of electric auxiliary heat exchangers.

This method differs from the method according to the invention primarily by the fact that heat is supplied by the aid of heat exchange mechanisms and that this occurs in such a manner that the above mentioned capillary forces are not destroyed. As mentioned, this results in a requirement of very high temperatures in order to squeeze the oil out of the mud. The temperature is stated to be approximately 260°–360° C., and this fits in with the experiments made during development of the method according to the present invention. It leads to the same problems mentioned as very important, i.e. oxidation or decomposition of the water-gas is not avoided in order to prevent formation of new compounds. According to the above method efforts are made to avoid this disadvantage by stressing the necessity of utilizing a neutral gas in connection with the process. It is also stated that it is a condition of a successful operation that all oxygen or oxidizing gases are carefully avoided during the heating period of the mud in the container. Experiments made by the inventor confirm this.

After evaporation, the waste-gas is conveyed to a condensor condensing the oil gases by direct sprinkling with water. This clearly differs from the method according to the invention, wherein cold oil is used as a condensing medium. Using water produces a considerable problem of separating the water/oil condensate, and it will never be possible to guarantee that the separated water is free of oil.

Since with oil based mud it is desired to use hydrocarbons that are not very toxic (Kero, Somentor 31, TSD 2803, or TSD 2832), there are, in addtion to the explosion hazard, problems with the material of the plant itself and sooting. The latter is most disadvantageous because decomposition products are formed, which cannot be controlled as regards the health hazard. It is an object of the present invention to reduce this problem.

One might assume that if the oil was distilled off from the mud under a vacuum sufficiently low boiling temperatures would be achieved. Experiments showed, however, that not even vacuum distillation results in sufficiently low temperatures.

With the methods of distillation known, inter alia those mentioned above, boiling temperatures of approximately 360° C. are necessary to drive off sufficient oil from the minerals.

SUMMARY OF INVENTION

In studies of the boiling process during experiments with distillation, it was found that the surface tensions are overcome and the polar forces between molecules are prevented by agitation, due to the fact that so rapid relative movement results between the molecules that they are prevented from bonding together. These circumstances are utilized in the present invention. The entire energy for the distillation process is supplied by agitation of the mud, the heat for boiling being provided by friction in the material. Due to the liberation of the water together with the oil, the boiling temperature of an oil-type drilling mud of interest (with Somentor 31 hydrocarbon oil) is 188° C. lower than with corresponding boiling in a retort. This means that the partial pressure of the oil constitutes approximately 50% of the total pressure of the gas mixture.

The invention, thus, relates to a method for distilling for separation of oil in water and other evaporable liquids from drilling mud, bleaching earth, sludge from oil tanks, oil shale, and the like, and said method is characterized in that evaporation of said mud is brought about at a lower temperature than that of conventional evaporation, due to the fact that the capillary forces bonding the separate fractions within the pores of the mud are destroyed in a friction evaporator.

The mud is beaten and broken by beating arms driven by a rotary source of power, e.g. an electric or combustion engine, this, at the same time, bringing about evaporation of water of crystallization as well as free water in the mud. The partial pressure from the oil vapour (including vapour from other liquids) in addition to the partial pressure of water form a total pressure in the gas mixture which results in reduction of the evaporation temperature of the entire gas mixture corresponding to the evaporation temperature for the partial pressure of the oil. The energy for this is supplied to the mud from the rotary source of power (energy) as frictional heat due to the friction between particles in the mud and between said particles and the beating arms.

Furthermore, the invention relates to draining-off the heat of condensation.

An injection condenser of the conventional kind or an ejector condenser is used. The novel feature is that a cooled condensate is used as a cooling agent. In addition to reducing the problems of separating oil and water, this is an approach that is not sensitive to dust pollution and also prevents any pollution of the cooling water.

Additionally, most of the heat of the dried mud can be recovered for preliminary heating of the untreated mud, the thermal efficiency, thus, being considerably increased.

In order to achieve confirmation about the method, especially whether the assumption regarding the reduction of temperature would come true a test plant of 45 kW was built. It consisted of an evaporation drum having a diameter of 550 mm and a length of 600 mm, within which a rotor provided with beating arms having a clearance of approximately 10 mm to the drum wall was provided. Said rotor was driven by a 45 kW synchronous motor having an amperemeter measuring the amperage provided on the inlet. The rotational speed of the rotor was approximately 2000 rpm. On top of the horizontally arranged drum a waste-gas tube was provided leading to a condenser, and a tube for feeding mud was provided. The oil used in drilling mud has different fractions evaporating at different temperatures. This clearly showed during the experiments. The temperature rapidly rose to approximately 42° C. and was maintained for a few minutes, until that fraction was displaced. Then the temperature rose a few degrees and was, again, constant until the next fraction was displaced. In this manner the temperature continued to rise for approximately 7 temperature levels, oil being meanwhile separated from the condensed gases. The reason why there was no increase of temperature at the different temperature levels until the fractions in question had evaporated is the the entire supplied energy was used for evaporating the oil.

When the temperature had reached 172° C. a gradual increase followed without further marked temperature steps or oil vapour.

The dried mud was a fine-grained powder having a pale colour in contrast to the raw material that was black. The colour and consistency of the dried mud was the same with cuttings and with oil barite.

The following results were achieved in the tests:
1. Raw sample 16% oil.
2. Raw sample 13,9% oil. Test 021084 172° C.
1. Sample 0% oil.
2. Sample 3,6% oil. Test 031084.
1. Sample 3,5%. Test 041084 150° C.
1. Sample 3,6% oil. Test 041084 160° C.
1. Sample 2,45% oil. Test 031084 172° C.
1. Sample 1,8% oil.

The reason for variations of the results are to be found in inaccuracy of the measuring method as well as in samples that were not quite homogenous.

DESCRIPTION OF THE PREFERRED EMBODIMENTS

Figure 1:
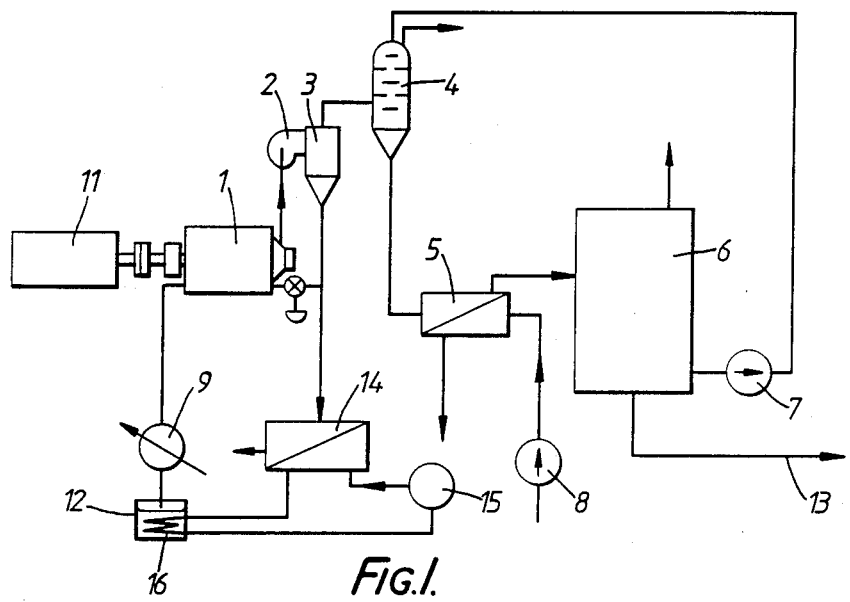
FIG. 1 is a block diagram showing the various apparatuses used in the method of separating oil according to the present invention.

The method shall now be disclosed in more detail with reference to FIG. 1 of the drawing.

Mud from mud tank 12 is fed via an adjustable pump 9 to an evaporator based on the friction principle and is, thus, called a friction evaporator. The mud will boil in said evaporater and the vapour goes via dust separator means, here represented by a ventilator 2 and a cyclone 3, to the direct contact condensator 4.

Dry mud appearing, here, as a fluidized powder is removed via regulating valve 10 free of oil. From the exit 10 the dried and warm mud may be conducted through a heat exchanger 14, where it will lose its heat to hot oil from a pump 15 pumping the heated oil to a heat exchanger 16 in tank 12 so as to pre-heat the untreated mud.

For further disposal of the dried mud in the shape of a powder said powder may be moulded to briquettes with ordinary cement added. The advantage of this is that the volume and, thus, the surface area of the powder is reduced, which strongly reduces the hazard of barium being released from the barite ($BaSO_4$) when the material is disposed in nature. The briquettes may be cubic, cylindric or the like and result in an easily manageable form of the powder that may be disposed in suitable dumps or the like.

In the direct contact condenser 4 the oil vapour is condensed by the aid of cooled oil from oil tank 6, which oil is supplied to the direct contact condenser 4 by the aid of a circulation pump 7.

The oil from condenser 4 is cooled in a heat exchanger 5 before returning to oil tank 6. Removal of heat from heat exchanger 5 occurs by the aid of accessible cooling water supplied by cooling water pump 8.

If the boiling process is to be carried out under a vacuum in order to obtain a further reduction of the boiling temperature, it will be necessary either to use a jet condenser or or to let waste gases from the condenser be removed via a vacuum pump.

Figure 2:
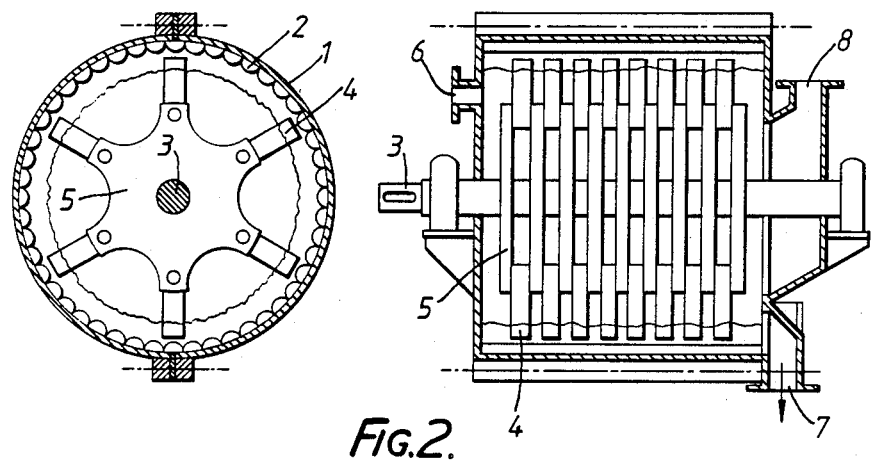
FIG. 2 illustrates the friction evaporator of the present invention.

The friction evaporator 1 will now be described with reference to FIG. 2 of the drawing.

The friction evaporator comprises a divisible cylindrical container 1 internally provided with elongated wearing ribs 2. Inside container 1 a rotor comprising drive shaft 3, rotor plates 5 and beating arms 4 is rotating.

Beating arms 4 are designed as known from conventional hammer mills, but they are made broader in the present case in order to avoid unnecessary pulverization of the mud particles.

When the rotor rotates (at 15000/1400 rpm) by the aid of an electric motor, mud will be slung outwards towards the cylinder wall and will form a rotating annulus with great internal friction between particles. Energy is, thus, supplied by friction between particles and between particles and said beating arms. It should be mentioned that there will be no contact between mud and the rotor plates on which the beating arms are mounted. Also, it is this principle that enables smashing other oily minerals, e.g. oil shale, in order to separate the oil from them.

The power from the electric motor is transferred to the mud as frictional heat.

Mud is supplied through an inlet 6 in one end wall of the container. When drilling mud is supplied continuously it will evaporate at such a rate in the friction evaporator that the rotating annulus in the container mainly consists of fluidized dry powder. This powder may then easily be drawn off continuously at the other end wall of the container via regulating valve 7 which is preferably controlled by the temperature 6 of the waste vapour.

The liberated vapour will travel towards the rotor centre and dust in the vapour will be quite efficiently separated off due to the cyclone effect, whereas the relatively pure vapour leaves the evaporator through waste vapour outlet 8.

Having described our invention, we claim:

1. In a method of separating oil, water, and other evaporable liquids from drilling mud, bleaching earth, sludge from oil tanks, oil shale, and the like mud, the improvement comprising evaporating the evaporable liquids from the mud into a vapor at a lower temperature of under about 175° C. than with conventional evaporation by beating and friction heating the mud and evaporable liquids without vacuum conditions sufficiently to destroy capillary forces bonding separate fractions of the evaporable liquids to the mud in a friction evaporator.

2. A method as stated in claim 1, wherein vapor from the friction evaporator is condensed by contact with a cooled condensate of the same kind of liquid as at least one of the evaporable liquids.

3. A method of separating oil, water, and other evaporable liquids from drilling mud, bleaching earth, sludge from oil tanks, oil shale, and the like mud, comprising:

beating mud having evaporable liquids bonded therewith by capillary forces in a friction evaporator sufficiently for destroying the capillary forces bonding the mud with the evaporable liquids and, without other heat, frictionally heating the mud and evaporable liquids sufficiently for bringing about evaporation of the evaporable liquids in the friction evaporator, whereby the latter evaporate at a lower temperature than without such beating; and separating evaporated volatile products from the mud in the friction evaporator.

4. The method of claim 3, and further comprising:

transferring the separated evaporated volatile products to a condensor; and condensing said volatile products in the condensor with a cooled condensate of the same kind of liquid as the evaporable liquids.

* * * * *